US012256723B2

United States Patent
Flint et al.

(10) Patent No.: US 12,256,723 B2
(45) Date of Patent: Mar. 25, 2025

(54) MOUNTING AND POSITIONING DEVICE FOR AN ELECTRONIC SENSOR IN A TERMITE MONITOR

(71) Applicant: PESENSE PTY LTD, Brisbane (AU)

(72) Inventors: Anthony Robert Flint, Carindale (AU); Peter Kenyon Simpson, Red Hill (AU); Ion Leslie Staunton, Pacific Pines (AU)

(73) Assignee: Pesense Pty Ltd, Brisbane (AU)

( * ) Notice: Subject to any disclaimer, the term of this patent is extended or adjusted under 35 U.S.C. 154(b) by 1572 days.

(21) Appl. No.: 16/226,868

(22) Filed: Dec. 20, 2018

(65) Prior Publication Data

US 2019/0191689 A1     Jun. 27, 2019

(30) Foreign Application Priority Data

Dec. 21, 2017  (AU) ................ 2017905133

(51) Int. Cl.
*A01M 1/02* (2006.01)
*A01M 25/00* (2006.01)

(52) U.S. Cl.
CPC .......... *A01M 1/026* (2013.01); *A01M 25/004* (2013.01); *A01M 2200/011* (2013.01); *A01M 2200/012* (2013.01)

(58) Field of Classification Search
CPC .......... A01M 1/02; A01M 1/026; A01M 1/10; A01M 1/20; A01M 1/2005; A01M 1/2011; A01M 25/004; A01M 2200/011; A01M 2200/012
USPC ................ 43/107, 111, 121, 131, 132.1, 133
See application file for complete search history.

(56) References Cited

U.S. PATENT DOCUMENTS

| 5,571,967 | A | 11/1996 | Tanaka et al. |
| 5,575,105 | A | 11/1996 | Otomo |
| 5,815,090 | A | 9/1998 | Su |
| 5,832,658 | A | 11/1998 | Randon |
| 5,877,422 | A | 3/1999 | Otomo |

(Continued)

FOREIGN PATENT DOCUMENTS

| AU | 2004229096 | 12/2004 |
| AU | 2009292169 | 3/2010 |

(Continued)

OTHER PUBLICATIONS

ZigBee Specification, "ZigBee Document 053474r06, Version 1.0", Dec. 11, 2004, ZigBee Standards Organization, ZigBee Alliance, Inc., 2400 Camino Ramon, Suite 375, San Ramon, CA 94583.

(Continued)

*Primary Examiner* — Peter M Poon
*Assistant Examiner* — Danielle A Clerkley
(74) *Attorney, Agent, or Firm* — Bonini IP Law, LLC; Frank J. Bonini, Jr.

(57) ABSTRACT

A mounting and positioning device 10 comprises a disc 11 having a termite detection region in the form of a hole 12. The device entices termites to the detection region 12 using termite scaffold as an array of slats 13 made from a termite consumable material fitted around the hole 12 using an array of flanges 14 which frictionally grip the slats. Concentric frangible sections in the form of weakened rings 22, 23, 24 and 25 permit marginal sections of the device to be removed so that it may fit inside different sized termite monitors.

22 Claims, 4 Drawing Sheets

(56) References Cited

U.S. PATENT DOCUMENTS

| | | | |
|---|---|---|---|
| 5,921,018 A | 7/1999 | Hirose et al. | |
| 5,950,356 A * | 9/1999 | Nimocks | A01M 1/2011 43/131 |
| 6,016,625 A | 1/2000 | Bishoff et al. | |
| 6,058,646 A | 5/2000 | Bishoff et al. | |
| 6,079,150 A | 6/2000 | Setikas et al. | |
| 6,079,151 A | 6/2000 | Bishoff et al. | |
| 6,178,834 B1 | 1/2001 | Cates | |
| 6,543,182 B2 | 4/2003 | Snell et al. | |
| 6,581,325 B2 | 6/2003 | Gordon | |
| 6,615,535 B2 | 9/2003 | Snell et al. | |
| 6,724,312 B1 | 4/2004 | Barber et al. | |
| 6,792,395 B2 | 9/2004 | Roberts | |
| 6,914,529 B2 | 7/2005 | Barber et al. | |
| 6,928,770 B2 | 8/2005 | Oi et al. | |
| 6,928,771 B1 | 8/2005 | Tesh | |
| 7,212,112 B2 | 5/2007 | Barber et al. | |
| 7,212,129 B2 | 5/2007 | Barber et al. | |
| 7,233,251 B2 | 6/2007 | Lewis | |
| 7,262,702 B2 | 8/2007 | Barber et al. | |
| 7,348,890 B2 | 3/2008 | Barber et al. | |
| 7,377,072 B2 | 5/2008 | Meier et al. | |
| 7,874,099 B2 * | 1/2011 | Cink | A01M 1/2011 43/132.1 |
| 8,026,822 B2 | 9/2011 | Borth et al. | |
| 8,407,933 B2 | 4/2013 | Cink | |
| 8,830,071 B2 | 9/2014 | Borth et al. | |
| 2002/0108295 A1 | 8/2002 | Aesch et al. | |
| 2002/0116866 A1 | 8/2002 | Aesch et al. | |
| 2003/0213161 A1 | 11/2003 | Gardner et al. | |
| 2004/0140900 A1 | 7/2004 | Barber et al. | |
| 2006/0016121 A1 | 1/2006 | Ballard et al. | |
| 2006/0025891 A1 | 2/2006 | Budike, Jr. | |
| 2006/0030290 A1 | 2/2006 | Rudolf et al. | |
| 2006/0207164 A1 | 9/2006 | Pearson | |
| 2006/0265941 A1 | 11/2006 | Newton | |
| 2006/0265944 A1 | 11/2006 | Meier et al. | |
| 2007/0290793 A1 | 12/2007 | Tran | |
| 2009/0094884 A1 | 4/2009 | Cink | |
| 2009/0192763 A1 | 7/2009 | Gardner, Jr. et al. | |
| 2012/0212338 A1 | 8/2012 | Borth et al. | |
| 2014/0123543 A1 | 5/2014 | Osseiran | |
| 2014/0325892 A1 | 11/2014 | Borth et al. | |
| 2016/0025652 A1 | 1/2016 | Go et al. | |

FOREIGN PATENT DOCUMENTS

| | | | |
|---|---|---|---|
| AU | 2013100496 | 5/2013 | |
| AU | 2013100497 | 5/2013 | |
| AU | 2013204958 | 1/2014 | |
| AU | 2014203633 | 7/2014 | |
| AU | 2014230408 | 9/2014 | |
| AU | 2013204887 | 10/2014 | |
| AU | 2016219646 | 8/2016 | |
| CN | 101127147 | 2/2008 | |
| CN | 108419775 A * | 8/2018 | A01M 1/02 |
| EM | 693375 | 2/1996 | |
| EM | 2016219724 | 8/2016 | |
| EP | 1563730 | 8/2005 | |
| EP | 2323478 | 5/2011 | |
| JP | 2004229536 | 8/2004 | |
| KR | 101388928 | 4/2014 | |
| WO | WO-9726788 A1 * | 7/1997 | A01M 1/2011 |
| WO | WO2004016085 | 8/2003 | |
| WO | 2010030346 | 3/2010 | |
| WO | WO2015179899 | 5/2015 | |

OTHER PUBLICATIONS

Peter Forstner, MSP430 Goes Zigbee/802.15.4, MSP430 Advanced Technical Conference 2006; Texas Instruments, Inc.

"Using MSP430 with Low-Power RF Devices", Chipcon Products From Texas Instruments, 2007.

"ZigBee™ Wireless Communications Overview", SLYB127, Texas Instruments, 2006.

"Low-Power RF Selection Guide", SLAB052, Texas Instruments, 2006.

John Davies, "MSP430 Microcontroller Basics", 2008, Elsevier, Ltd.

Jerry Luecke, "Analog and Digital Circuits for Electronic Control System Applications—Using the TI MSP430 Microcontroller", 2005, Elsevier Inc.

"MSP430x2xx Family", Users Guide, Mixed Signal Products, 2008, Texas Instruments, Inc.

"MSP430x5xx Family", Users Guide, Literature No. SLAU208D, June 2008—Revised May 2009, Texas Instruments, Inc.

ZigBee Specification, Document 053474r17, Jan. 17, 2008, ZigBee Alliance.

Yan Zhang, Jijun Luo, Honglin Hu, "Wireless Mesh Networking, Architectures, Protocols and Standards", Wireless Networks and Mobile Communications Series, 2007.

Drew Gislason, "ZigBee Wireless Networking", newnespress.com, Aug. 29, 2008.

\* cited by examiner

MOUNTING AND POSITIONING DEVICE FOR AN ELECTRONIC SENSOR IN A TERMITE MONITOR

TECHNICAL FIELD

This invention relates to a monitoring and positioning device for an electronic sensor in a termite monitor and in particular but not limited to a retrofit for existing termite monitors so that the monitors may be electronically checked for the presence of termites.

BACKGROUND

The applicant has devised an electronic monitoring system for termites as described in applicant's patent application publication no WO/2015/179899 (now U.S. application Ser. No. 15/313,931 and AU application No. 2015268082). The disclosure of this specification is incorporated herein by cross reference in its entirety.

The Applicant is the first to recognise the desirability of a mounting and positioning device for an electronic termite sensor. The above referenced co-pending applications teach, in one embodiment, the use of a sensing module that may be removably fitted into a termite monitor by using a socket in the monitor to position the sensor in close proximity to a detection region which itself is close to attractant slats in the monitor. The present invention concerns a useful alternative to this type of mounting and positioning.

OUTLINE

While it is preferable that the present invention be applied to applicant's sensor, it will be apparent that the present invention may be applied to any electronic sensor.

In one aspect therefore there is provided a mounting and positioning device for an electronic sensor in a termite monitor, the mounting and positioning device including a termite enticement, preferably an assembly of consumable material and having adjacent thereto a termite detection region and the device being operably fittable inside a termite monitor and being adapted to position an electronic sensor adjacent the termite detection region, the assembly being configured to draw termite activity to the detection region for detection by the electronic sensor activated by termite activity in the detection region. Preferably, the enticement forms a termite scaffold leading from a position remote from the detection region to a position proximal the detection region. In this embodiment it is preferable that in use the termite scaffold extend downwardly from the detection region. Typically the termite scaffold hangs from a main body, the scaffold being removably attached to the main body.

The sensor may be secured to the device or may be simply placed in a sitting position or may be integrally formed as part of the whole device.

Typically the enticement forms a termite scaffold leading from a position remote from the detection region to a position proximal the detection region, the termite scaffold extending downwardly from the detection region, the device having a main body and scaffold attachment around the detection region for removable attachment of the scaffold. Preferably, the termite enticement is an assembly and comprises termite attractant located in proximity to the termite detection region so that termites are enticed to climb onto and consume the attractant and thereby be drawn into activity in the termite detection region.

In one preferred embodiment the termite detection region comprises an opening that termites instinctively desire to close as enticement. In addition as an aid and further enticement the enticement may be an assembly which comprises consumable material directionally placed to lead termites to the detection region. In one embodiment this can comprise spaced units of consumable material secured about the termite detection region. The units be in an array held by a corresponding array of attachment means.

To this end it is preferable that the termite detection region be located inside a marginal peripheral region adapted to bring about the operative securement of the device in a monitor while the consumable material is connected in an intermediate area between the marginal region and the termite detection region.

To this end it is preferable there be consumable material attachment means so that the consumable material may be secured in place around the termite detection region.

In one preferred embodiment the device comprises a substantially planar unit having one or more detection regions and consumable material attachment means adjacent the one or more detection regions. Preferably, the consumable material comprises a number of independent consumable material elements that are secured around the or each detection region. Preferably, the consumable material is assembled as an array or column. Preferably, there is provided a corresponding array of connections so that the consumable material may be connected to the mounting and positioning device opposite the sensor. To this end the array may comprise an array of projections surrounding the termite detection region.

In the case of a retrofit assembly, the device typically is adjustable to fit different monitors. Adjustability may be by any extension, retraction or removal of sections. In one case the adjustment comprises frangible sections which may be removed in order to suit different sized monitors for the purpose of retrofitting. Preferably, in the case of retrofitting to cylindrical monitors the mounting device has a body which is preferably disc like having concentric frangible rings so that the diameter of the device may be adjusted to suit the existing monitors of different diameters.

BRIEF DESCRIPTION OF THE DRAWINGS

In order that the present improvements may be more readily understood and put into practical effect reference will now be made to the accompanying drawings which illustrate preferred embodiments of the invention and wherein:—

METHOD OF PERFORMANCE

Figure 1:
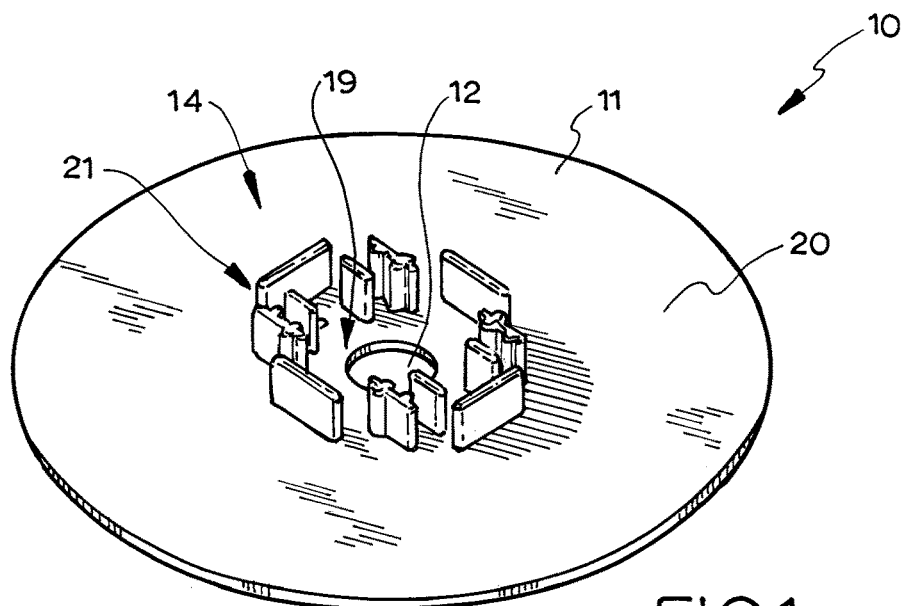
FIG. 1 is an underside view of a mounting and positioning device according to the present invention.
Figure 2:
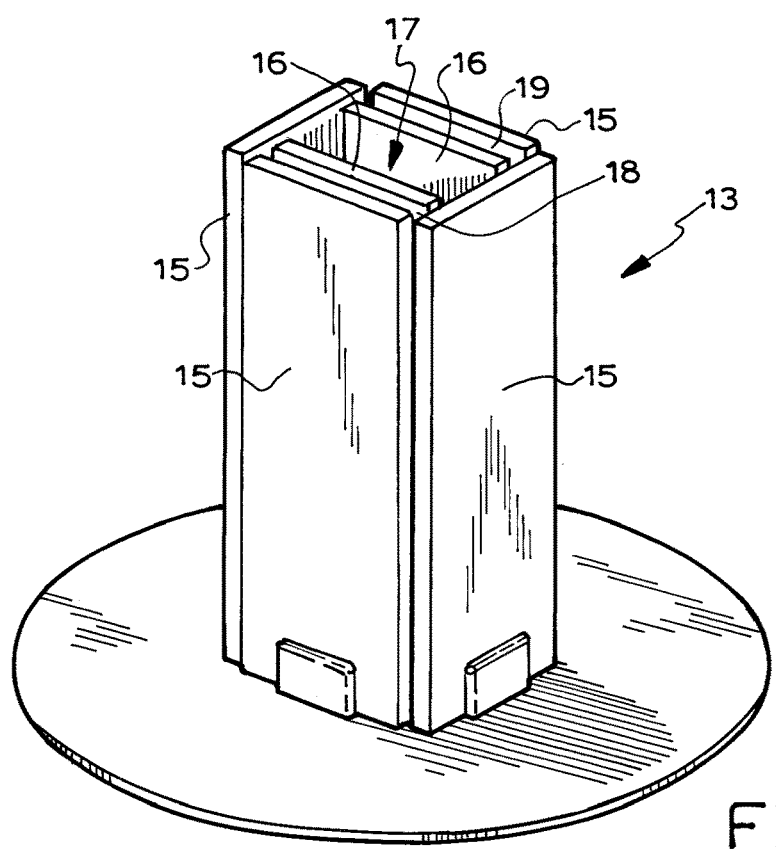
FIG. 2 is a device of FIG. 1 with consumable termite attractant fitted in position as further enticement.
Figure 3:
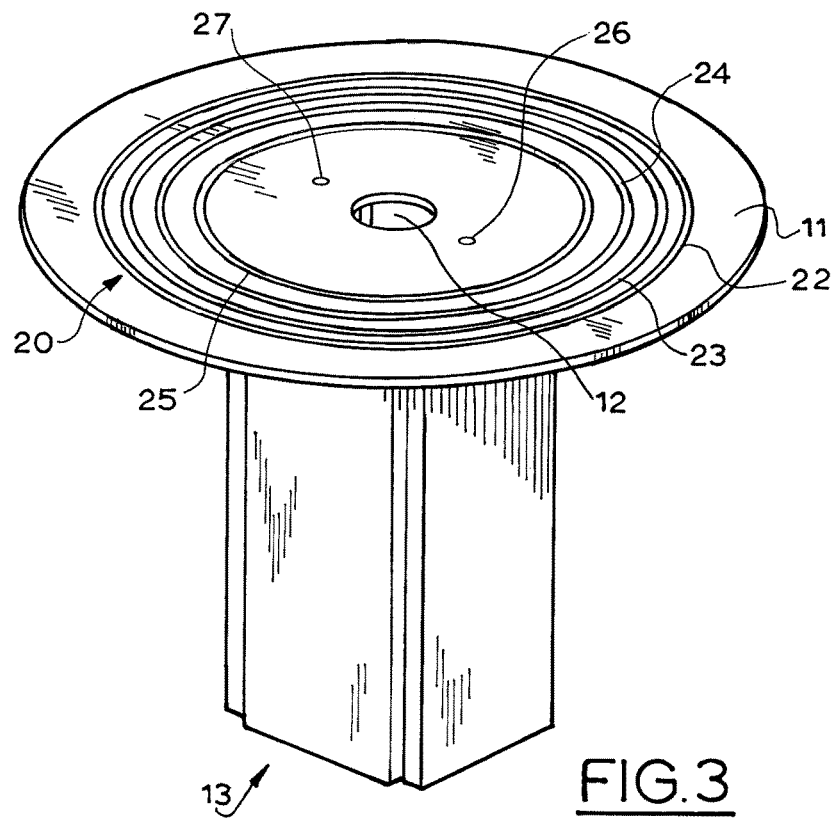
FIG. 3 is an inverted view of FIG. 2.
Figure 4:
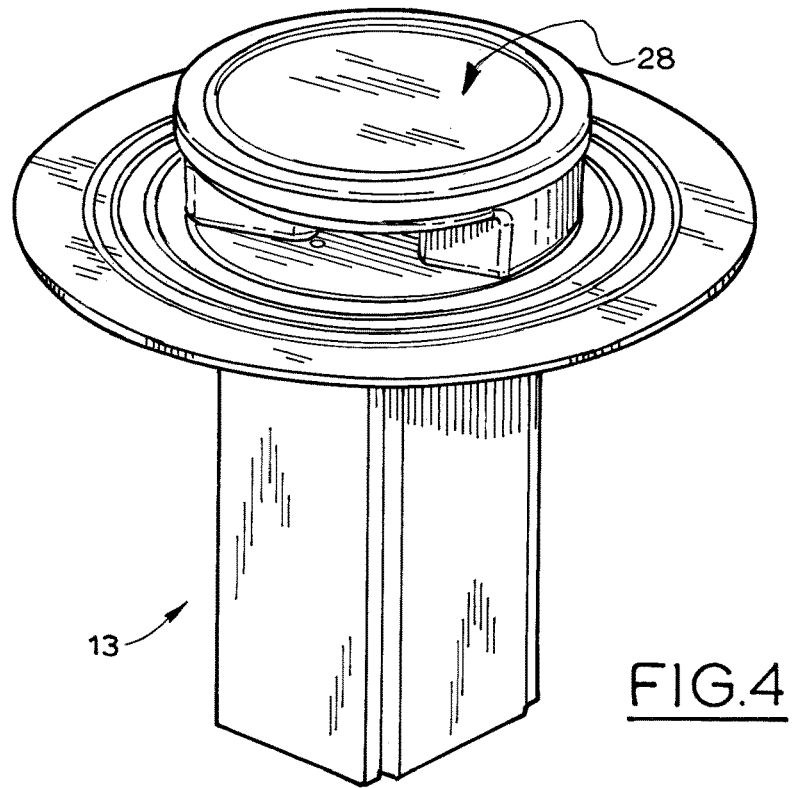
FIG. 4 is the view of FIG. 3 with a sensor in place.

Referring to the drawings and initially to FIG. 1 there is illustrated a mounting and positioning device 10 that according to the present invention has a main body which in this case is in the form of a disc 11 having a termite detection region in the form of a hole 12. This hole may be positioned so that termites instinctively close the hole and are enticed to do so in order to prevent humidity loss and by the positioning of that hole relative to attractant ordinarily held inside a termite monitor. When the disc is inverted from the position in FIG. 2 to the position as illustrated in FIGS. 3 and 4 and to further entice termites to the detection region 12 the device 10 uses termite scaffold as an array of slats 13 made from a termite consumable material, usually a type of timber that the termites prefer to eat. These are fitted around the hole 12 using attachments as in this case an array of flanges 14 which frictionally grip the slats. This keeps the slats apart so that there are outer slats 15 and inner slats 16 and a medial gap 17 which is slightly larger than the gaps 18 and 19. The arrangement of the array of flanges around the hole 12 provide material to aid the termites reaching the hole 12.

The disc 11 has an inner region 19 which may be described as the general detection region, an outer marginal region 20 and an intermediate connection region 21 whereby the extra enticement slat array is secured to direct termites toward the detection region 19 and hole 12.

The outer marginal region in the present embodiment 20 has concentric frangible sections in the form of weakened rings 22, 23, 24 and 25 and mounting holes 26 and 27 for a sensor module to be described below, see FIGS. 3 and 4.

Figure 5:
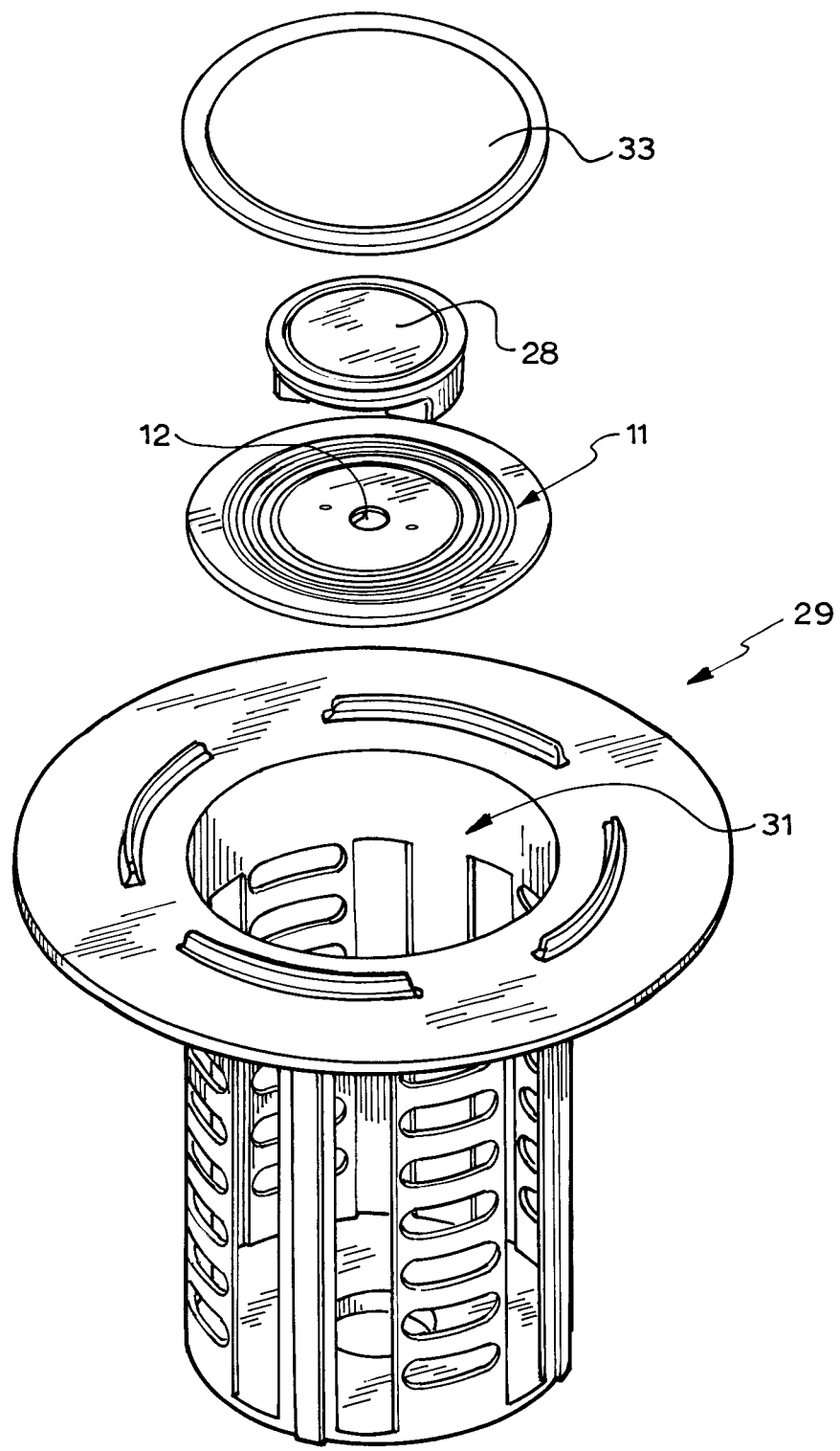
FIG. 5 is an exploded view showing application of the present invention as retrofit to one type of termite monitor.
Figure 6:
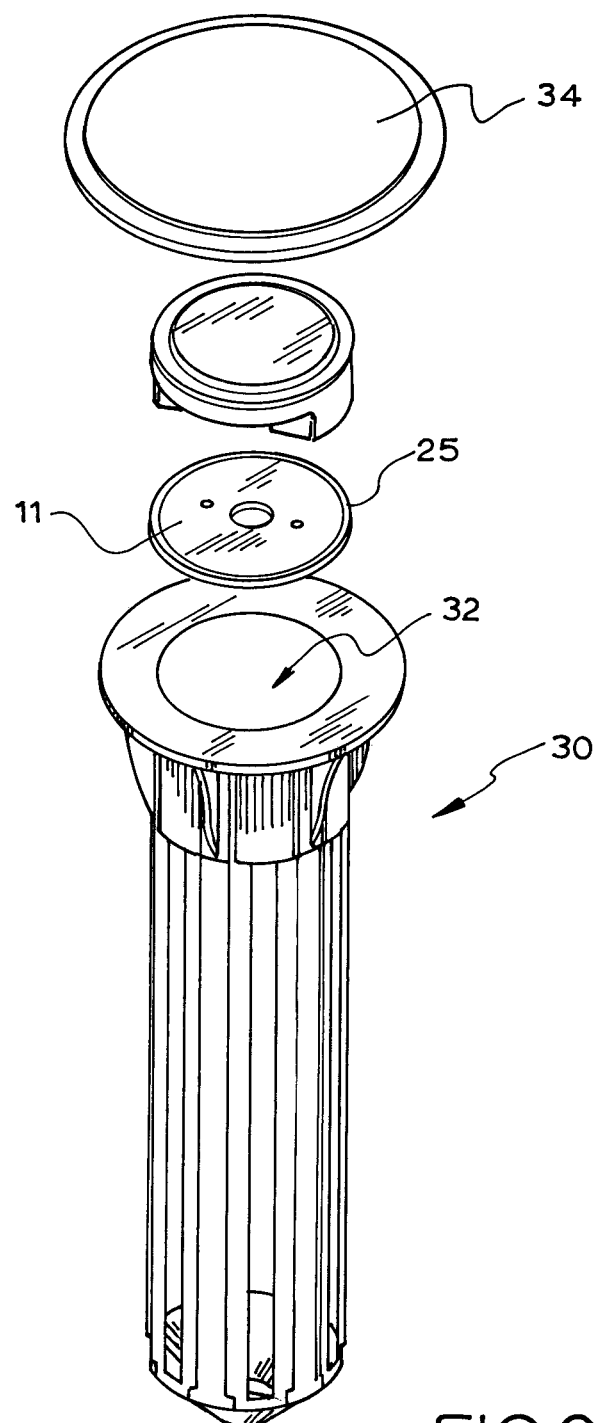
FIG. 6 is an exploded view of application of the present invention to a second type of termite monitor.

The frangible concentric rings permit marginal sections of the device to be removed so that it may fit inside different sized termite monitors. In this case the monitors are typically of the in-ground type as is shown in FIGS. 5 and 6. These usually have a cap and the cap is lifted so that the interior may be manually inspected.

The electronic sensor assembly 28 is shown in FIG. 4 simply sitting in position above the detection hole 12 and this may simply be set in place and there may be locating projections or the ring 25 may comprise a ridge aiding in the location of the sensor in position or the sensor may be secured in position using small screws passing through the holes 26 and 27 into an underside surface of the sensor assembly 28.

FIGS. 5 and 6 illustrate application of the present invention to two types of existing monitors 29 and 30 which are basically cylindrical monitors which as far as is important to the present invention are in-ground monitors and these have different internal diameter sections 31 and 32. As can be seen in FIG. 5 the whole of the disc 11 is employed whereas in FIG. 6 the disc has been broken down to the inner ring 25 so that it fits snugly into the cylindrical opening 32.

FIGS. 5 and 6 illustrate application of the invention in its simplest form noting that usually the monitors 29 and 30 have their own attractant material in the monitors consequently the array of consumable material is not shown because it is not necessarily needed in order for the present invention to be utilised, so in its simplest form the disc 11 is fitted inside the monitor 29 or 30 the sensor 28 is placed in position over the hole 12 and the existing caps 33 and 34 are placed in position to cover the whole assembly. The sensor 28 then communicates a signal to a receiver when it detects activity in the detection region of opening 12. In order to enhance the speed of detection an array of slats 13 may be employed in each of these monitors.

Whilst the above has been given by way of illustrative example many variations and modifications will be apparent to those skilled in the art without departing from the broad ambit and scope of the invention as herein set out in the appended claims.

What is claimed is:

1. A mounting and positioning device for an electronic sensor in a termite monitor, the mounting and positioning device comprising an assembly including a termite enticement adjacent a termite detection region, the termite detection region being in the form of a hole and the device being operably fittable inside a termite monitor and being adapted to position an electronic sensor adjacent the termite detection region, the assembly being configured to draw termite activity to the detection region for detection by the electronic sensor activated by termite activity in the detection region, and further wherein the hole is adapted to be between the enticement and the electronic sensor such that the electronic sensor is wholly spaced from the detection region;

wherein a main body is in the form of a disc and wherein the termite enticement forms a scaffold fitted around the hole, the disc having attachments holding the scaffold and an outer marginal region having concentric frangible sections in the form of weakened rings for adjustment of the diameter of the disc.

2. A mounting and positioning device according to claim 1 wherein the scaffold leads from a position remote from the detection region to a position proximal the detection region.

3. A mounting and positioning device according to claim 1 wherein the scaffold leads from a position remote from the detection region to a position proximal the detection region, the scaffold in use extending downwardly from the detection region.

4. A mounting and positioning device according to claim 1 wherein the scaffold leads from a position remote from the detection region to a position proximal the detection region, the scaffold extending downwardly from the detection region.

5. A mounting and positioning device according to claim 1 wherein the scaffold leads from a position remote from the detection region to a position proximal the detection region, the scaffold hanging from a main body, and the scaffold being removably attached to the main body.

6. A mounting and positioning device according to claim 1 wherein the termite enticement comprises termite attractant.

7. A mounting and positioning device according to claim 1 wherein the enticement comprises consumable material directionally placed to lead termites to the detection region, and wherein the scaffold fitted around the hole comprises slats that are formed from the consumable material.

8. A mounting and positioning device according to claim 7 wherein the device comprises a substantially planar unit insertable into a termite monitor wherein the slats comprise a number of independent consumable material elements that are secured around each detection region and the consumable material is assembled as an array or column and there is provided corresponding connections so that the consumable material is connectable to the mounting and positioning device opposite the sensor when the sensor is positioned by the device.

9. A mounting and positioning device according to claim 1 wherein the enticement comprises an assembly of consumable material directionally placed to lead termites to the detection region and wherein the scaffold comprises spaced units of consumable material secured about the termite detection region by the attachments.

10. A mounting and positioning device according to claim 1 wherein the device includes a peripheral region and the termite detection region is located inside the peripheral region which is adapted to bring about the operative securement of the device in a termite monitor while the enticement comprises consumable material, and wherein the scaffold is connected in an intermediate area between the marginal region and the termite detection region.

11. A mounting and positioning device according to claim 1 wherein the device is adjustable.

12. A mounting and positioning device according to claim 1 wherein the device is adjustable by extension, retraction or removal of removable sections from the device, the removable sections being connected to the device adjacent to the termite detection region.

13. A mounting and positioning device according to claim 1 wherein the device is adjustable by the frangible sections being removable in order to suit different sized termite monitors for the purpose of retrofitting.

14. A mounting and positioning device according to claim 1 wherein the scaffold comprises an array of slats held apart by the attachments so that there are outer slats and inner slats with gaps between the slats.

15. A mounting and positioning device according to claim 1 the disc having an inner region adjacent the detection region, the outer marginal region and an intermediate connection region between the inner and outer regions whereby the scaffold comprises an enticement slat array that is secured to direct termites toward the detection region.

16. A mounting and positioning device according to claim 1 wherein the disc is adapted to slidably fit inside a corresponding cylindrical body of a termite monitor with a termite sensor above the disc and the scaffold below the disc opposite the sensor.

17. A mounting and positioning device according to claim 1 wherein the scaffold leads from a position remote from the detection region to a position proximal the detection region, the scaffold extending downwardly from the detection region, the scaffold being removably attached to the main body, the main body comprises a substantially planar unit insertable into a termite monitor, the hole adapted to be positioned directly below the sensor.

18. A mounting and positioning device according to claim 1 wherein the device comprises a substantially planar unit insertable into a termite monitor and having one or more detection regions, wherein the termite enticement comprises consumable material, wherein the scaffold is formed of slats comprising the consumable material, and wherein the attachments holding the scaffold comprise flanges adjacent the one or more detection regions, said flanges adapted to hold the consumable material.

19. A mounting and positioning device according to claim 1 wherein the device comprises a substantially planar unit insertable into a termite monitor, and wherein the attachments holding the scaffold comprise flanges adjacent the detection region, wherein the termite enticement comprises consumable material, wherein the scaffold is formed of slats comprising the consumable material, and wherein the flanges are adapted to hold the consumable material, and further wherein the slats comprise a number of independent consumable material elements that are secured around the detection region as an array or column and there is provided corresponding connections so that the consumable material is connected in position opposite the sensor when the sensor is positioned by the device.

20. A mounting and positioning device for an electronic sensor in a termite monitor, the mounting and positioning device comprising an assembly including a termite enticement adjacent a termite detection region, the termite detection region being in the form of a hole and the device being operably fittable inside a termite monitor and being adapted to position an electronic sensor adjacent the termite detection region, the assembly being configured to draw termite activity to the detection region for detection by the electronic sensor activated by termite activity in the detection region, and further wherein the hole is adapted to be between the enticement and the electronic sensor such that the electronic sensor is wholly spaced from the detection region;

wherein the enticement forms a termite scaffold leading from a position remote from the detection region to a position proximal the detection region, the termite scaffold extending downwardly from the detection region, the device having a main body and scaffold attachment around the detection region for removable attachment of the scaffold, the main body comprises a substantially planar unit insertable into a termite monitor and being in the form of a disc, the hole adapted to be positioned directly below the sensor, the disc having lines of weakness for selective removal of outer parts of the disc, each line of weakness corresponding to a termite monitor for removal of that part of the disc to enable mounting in a matching termite monitor.

21. A mounting and positioning device for an electronic sensor in a termite monitor, the mounting and positioning device comprising an assembly including a termite enticement adjacent a termite detection region and the device being operably fittable inside a termite monitor and being adapted to position an electronic sensor adjacent the termite detection region, the assembly being configured to draw termite activity to the detection region for detection by the electronic sensor activated by termite activity in the detection region; wherein a main body is in the form of a disc having the termite detection region in the form of a hole and wherein the termite enticement forms a scaffold fitted around the hole, the disc having attachments holding the scaffold, an outer marginal region having concentric frangible sections in the form of weakened rings for adjustment of the diameter of the disc.

22. A mounting and positioning device for an electronic sensor in a termite monitor, the mounting and positioning device comprising an assembly including a termite enticement adjacent a termite detection region and the device being operably fittable inside a termite monitor and being adapted to position an electronic sensor adjacent the termite detection region, the assembly being configured to draw termite activity to the detection region for detection by the electronic sensor activated by termite activity in the detection region; wherein the enticement forms a termite scaffold leading from a position remote from the detection region to a position proximal the detection region, the termite scaffold extending downwardly from the detection region, the device having a main body and scaffold attachment around the detection region for removable attachment of the scaffold, the main body comprises a substantially planar unit insertable into a termite monitor and being in the form of a disc, the termite detection region being in the form of at least one hole adapted to be positioned directly below the sensor, the disc having lines of weakness for selective removal of outer parts of the disc, each line of weakness corresponding to a termite monitor for removal of that part of the disc to enable mounting in a matching termite monitor.

* * * * *